Nov. 10, 1931.   O. HÜBNER   1,831,449
JOURNAL BEARING FOR RAILWAY CAR AXLES
Filed Dec. 5, 1927   2 Sheets-Sheet 1

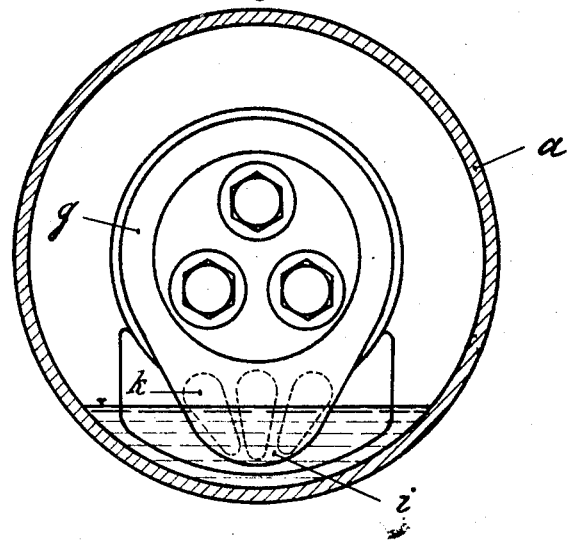

Patented Nov. 10, 1931

1,831,449

UNITED STATES PATENT OFFICE

OTTO HÜBNER, OF BERLIN, GERMANY, ASSIGNOR TO THE FIRM VEREINIGTE STAHL-WERKE AKTIENGESELLSCHAFT, OF DUSSELDORF, GERMANY

JOURNAL BEARING FOR RAILWAY CAR AXLES

Application filed December 5, 1927, Serial No. 237,816, and in Germany March 20, 1926.

The present invention relates to an improved construction of a journal bearing for railway car axles.

As the journal, which with the hitherto used axle bearings rests in a bearing cup, is liable to easily come out of the latter due to the shocks unavoidable on railways and to the play unlimited in downward direction, it has already been proposed to mount the journal in a bearing bush enclosing the latter and firmly inserted in the bearing box. The hitherto constructions of such closed bearing bushes have, however, the drawback that the lubrication of the journal becomes rather cumbersome and is in most cases insufficient.

According to the present invention, the difference between the improved arrangement and those of known art consists in the fact that the diameter of the boring of the bearing bush is several millimeters larger than the diameter of the journal. By this improved arrangement, the advantage is attained that the oil collecting in the space left is caused by the upwardly revolving journal to participate in this movement and is thereby conveyed to the supporting place, whereby a good lubrication of the strained parts is obtained, while on the other hand the oil cushion at the bottom of the box serves as a buffer against the jumping of the journal in the bearing bush and thus damps the shocks, which results in a sparing of the wearing parts of the whole bearing. The bearing bush, which is secured against displacement and rotation by lateral screws, forms, by a collar thereon and a thrust plate screwed upon the end of the journal and bearing against said collar, a thrust bearing and can be easily exchanged after loosening the bearing bush cover.

According to the invention, the widened boring of the bearing bush has such a height that the lubricating oil there collected remains in permanent contact with the journal, while the lubricant is prevented from being pressed out by means of the thrust plate screwed upon the end of the journal and bearing against the collar of the bearing bush, said closing of the widened boring at one side thereof allowing to keep the lubricant therein. To equalize the wear of the collar of the bearing bush, suitably, equalizing sheet-metal discs are inserted between the end of the journal and the thrust plate thereon, whereby, upon wear of the collar of the bearing bush, a very simple readjustment of the thrust bearing can take place without a removal of the bearing bush from the journal.

According to the invention, the individual parts of the journal bearing are so constructed that the lubricant is supplied to the widened boring of the bearing bush from the lower part of the journal box, in order to ensure a good and reliable lubrication of the lubrication at low speed as well as at high speed of the journal. To this end, in the thrust-bearing collar of the bearing bush lubricating grooves are provided merging obliquely into the bearing bush boring. Oblique baffling walls fixed to the journal box are arranged at the outer ends of these lubricating grooves. In the bearing bush about in level with the central line of the bearing bush oil distributing grooves slightly downwardly inclined extend in the longitudinal direction of the bearing bush boring, and join said lubricating grooves, so that by this total distribution system the lubricant, raised by an oil siphon arranged on the thrust bearing plate on the journal end, is distributed over the journal and over the widened space between journal and bearing bush. To keep the specific surface pressure as low as possible, the lubricating grooves running in the bearing bush in the direction of its boring are arranged in the non-bearing parts of the bearing bush and shaped like a roof gutter for securely conveying the lubricant therein.

Said effect is obtained in a particularly favourable manner if lower edges of the baffling walls arranged in the journal bearing box join the upper ends of the oblique grooves in the collar of the bearing bush so that the oil projected by the oil siphon against said baffling walls is conducted by the two lateral surfaces of these baffling walls into the grooves, which at the same time may form the lubricating grooves of the thrust bearing.

By the improved construction of the journal bearing the manufacture of the same is rather simplified as its working is limited to turning and boring, while the closed fixed bearing bush allows a better reception of the forces from all directions and the jumping and bumping of the journal bearing bush is reduced to the small dimensions of the space below the journal. A further advantage consists in that the lateral forces are taken up by the thrust bearing in an essentially better way than hitherto by a broad circular ring plane, so that the lateral wear of the bearing is thereby considerably decreased. By the thrust plate screwed on the journal end, with the equalizing discs inserted therein, a simple lateral re-adjustment of the bearing is possible. Whereas hitherto with closed bearings it was generally possible only to attain a reliable lubrication of the bearing by leading the oil under pressure to the bearing places, the present invention provides a journal bearing, in which the arrangement of the oil siphon in combination with the bafflings and oil grooves and the oil collecting space, that is, the total distribution system, ensures a reliable lubrication of all bearing parts at any speed of the journal, because the lubricant can be freely supplied to all required places and distributed over the whole length of the journal.

The accompanying drawings illustrate by way of example a preferred constructional form of the improved journal bearing:

Fig. 3 is a cross-section on the line 3—3 of Fig.,

Fig. 4 is a horizontal central section through the bearing box and bearing bush, Fig. 5 is an end view of the journal end with the thrust plate thereon and the oil siphon arranged on the latter, the bearing box being shown in section on the line 3—3 of Fig. 1.

Figure 1:
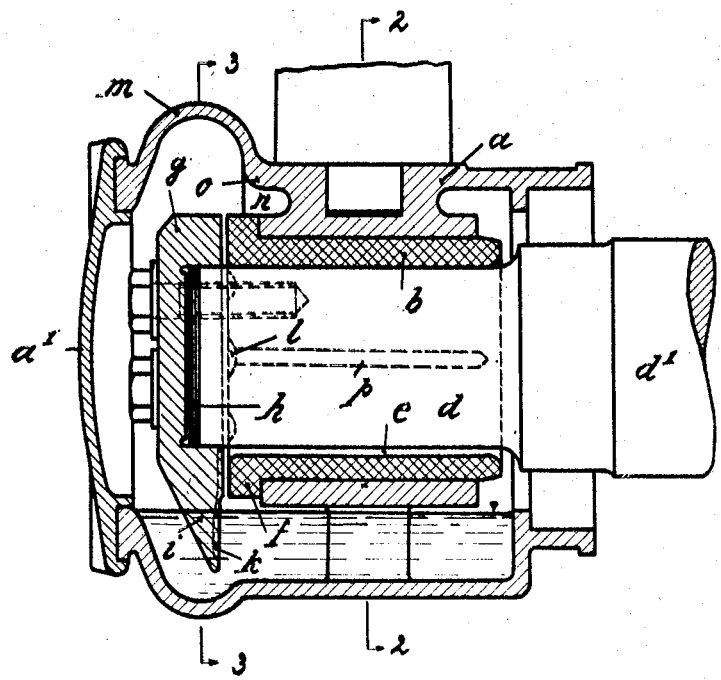
Fig. 1 is a longitudinal section through the same.
Figure 2:
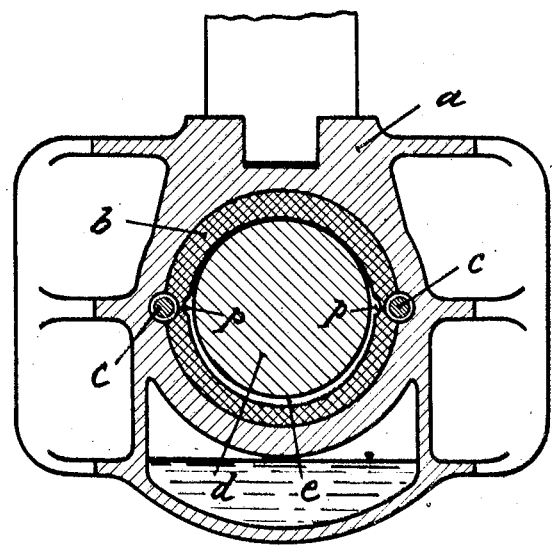
Fig. 2 is a cross-section on the line 2—2 of Fig. 1.

Through the open outer end of the integral journal bearing box $a$, which can be closed by a cover $a^1$, an integral bearing bush $b$ is placed over the journal $d$ of car axle $d^1$ and so fixed at its outer sides by means of two screw-bolts $c$ that neither a lateral displacement nor a rotation thereof can take place even by action of strong forces thereon. The diameter of the boring of the bearing bush is several millimeters larger than the diameter of the journal $d$, so that below the latter a space $e$ of sickle-shaped cross-section is formed for the reception of oil therein and sufficient room is left for forming there a strong oil cushion. Said oil cushion limits at the same time an upward jumping of the journal bearing box, which might happen when it is exposed to heavy shocks.

The front end of the bearing bush $b$ is fitted with a broad collar $f$, of which the outer face serves as a thrust ring for taking-up lateral forces, a thrust plate $g$ screwed on the journal end bearing against said thrust bearing ring, which thus together with said thrust plate forms a thrust bearing. Between the journal end and the thrust plate $g$ a plurality of juxtaposed equalizing discs or washers $h$ of sheet metal are inserted, which allow a simple and easy re-adjustment of the thrust bearing to suit wear of its contact faces without removal of the journal bearing bush from the journal.

The thrust plate $g$ carries a downward projection $i$ that is provided with suitable pockets $k$ and which during the rotation of the journal raises the oil from the lower oil collector of the bearing box, which oil then, either, flows during the raised position of the projection into the lubricating grooves $l$ of the bearing bush, or, is projected by centrifugal force on to the inner wall $m$ of the bearing box facing said projection whence it flows partly into the oil collecting cavities $n$ and partly to the end wall of the journal bearing. The oil collecting cavities are arranged in the upper part of the bearing bush in such a way that they receive oil even if occasionally the oil is thrown off from the projection $i$ prior to its attaining the highest position. To this end, the cavities $n$ are formed by ribs $o$ so arranged that their lateral surfaces supply the oil to the grooves $l$ in the thrust bearing. Said ribs $o$ and the lubricating grooves $l$ are radially arranged, and any suitable number thereof may be provided. The oil flows from the lubricating grooves $l$ through the longitudinal grooves $p$, which are preferably of roof gutter cross-section, into the sickle-shaped space $e$ formed between the journal $d$ and the widened boring of the bearing bush. Thus, there an oil cushion is produced, which during the rotation of the journal in upward direction is led along with the latter and thereby ensures a reliable lubrication thereof on its whole length.

At low speed of the journal, the oil raised by the oil siphon $i$, $k$ flows down at the highest place and directly into the grooves $l$, through which it enters the interior of the bearing bush as above explained. Part of the oil serves, however, also for lubricating the thrust bearing. At higher speeds of the journal, the oil is mainly projected into the upper cavities $n$ of the journal bearing box $a$, whence it flows down the lateral surfaces of the ribs $r$ and from the lower edges of the latter into the grooves $l$ and on to the journal $d$, as already mentioned. In this way, a reliable lubrication of the journal bearing is attained at any speed of the journal.

What I claim, is:

1. In combination with a journal bearing for railway car axles having a bearing bush with a bore of greater diameter than the outer diameter of the journal and completely enclosing the latter to form an oil collecting space below the journal, a journal box having an oil collector, a collar on the outer end of said bearing bush, a thrust plate screwed to the journal end and bearing against said collar both together forming a thrust bearing for said journal, and a projection on the circumference of said thrust plate having pockets therein directed towards said bearing bush and adapted to project into the oil collector at the lower part of the bearing box.

2. In combination with a journal bearing for railway car axles of the kind as specified in claim 1, longitudinal grooves in the oil collecting space of the bearing bush running with slight fall in longitudinal direction in level with the middle line of the bearing bush, lubricating grooves in the collar running obliquely into the boring of the bearing bush joining said longitudinal grooves in the same and forming the lubricating grooves for said thrust bearing, and oblique bafflings fixed to the bearing box, their lower ends joining the upper and outer ends of said grooves.

In testimony whereof I have hereunto set my hand.

OTTO HÜBNER.